United States Patent
Iwano (10) Patent No.: US 10,655,691 B2
(45) Date of Patent: May 19, 2020

(54) ONE-WAY CLUTCH APPARATUS

(71) Applicant: NSK-Warner K.K., Shinagawa-ku, Tokyo (JP)

(72) Inventor: Akira Iwano, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 25 days.

(21) Appl. No.: 16/166,044

(22) Filed: Oct. 19, 2018

(65) Prior Publication Data
US 2019/0120299 A1    Apr. 25, 2019

(30) Foreign Application Priority Data

Oct. 23, 2017   (JP) .................................. 2017-204535

(51) Int. Cl.
*F16D 41/06* (2006.01)
*F16D 41/07* (2006.01)
*F16D 43/28* (2006.01)

(52) U.S. Cl.
CPC .............. *F16D 41/07* (2013.01); *F16D 43/28* (2013.01); *F16D 2041/0603* (2013.01); *F16D 2041/0605* (2013.01)

(58) Field of Classification Search
CPC ............. F16D 41/07; F16D 2041/0605; F16D 2041/0603; F16D 43/28; F16D 2300/12; F16D 41/067
See application file for complete search history.

(56) References Cited

U.S. PATENT DOCUMENTS

| | | | | |
|---|---|---|---|---|
| 5,664,653 A * | 9/1997 | Kurita | ..................... | F16D 41/07 188/82.1 |
| 5,676,226 A * | 10/1997 | Lampela | ................. | F16D 41/07 192/45.1 |
| 7,766,140 B2 * | 8/2010 | Ponson | ................... | F16D 7/021 192/110 B |
| 8,491,439 B2 * | 7/2013 | Kimes | ................... | F16D 41/084 192/43.1 |
| 2002/0148697 A1 * | 10/2002 | Muramatsu | ............. | F16D 41/12 192/46 |
| 2008/0179156 A1 * | 7/2008 | Byun | .................... | F16D 41/066 192/45.1 |

(Continued)

FOREIGN PATENT DOCUMENTS

JP    2012-067862 A    4/2012

*Primary Examiner* — David J Hlavka
(74) *Attorney, Agent, or Firm* — SGPatents PLLC (57) ABSTRACT

A one-way clutch apparatus of torque input-switching type in which torque capacity can be secured without increasing an axial dimension. The one-way clutch apparatus of drive input-switching type, includes a plurality of first torque transmitting members interposed between a shaft 3 and an intermediate ring 7 at circumferential predetermined intervals, and provided for transmitting torque between the shaft 3 and the intermediate ring 7, and a plurality of second torque transmitting members interposed between the intermediate ring 7 and an outer ring 5 at circumferential predetermined intervals, and provided for transmitting torque between the intermediate ring 7 and the outer ring 5, in which either the torque input into the shaft 3 or the torque input into the outer ring 5 is transmitted to the intermediate ring 7, in which the first torque transmitting member is a sprag 23 and the second torque transmitting member is a roller 29.

13 Claims, 3 Drawing Sheets

(56) References Cited

U.S. PATENT DOCUMENTS

| | | |
|---|---|---|
| 2012/0076675 A1 | 3/2012 | Nomura et al. |
| 2015/0176662 A1* | 6/2015 | Lee ...................... F16D 25/061 192/45.1 |
| 2017/0108059 A1* | 4/2017 | Tsukamoto ............. F16D 47/04 |
| 2018/0172088 A1* | 6/2018 | Peglowski ............. F16D 41/04 |

* cited by examiner

ONE-WAY CLUTCH APPARATUS

The disclosure of the following priority application is herein incorporated by reference:
Japanese Patent Application No. 2017-204535.

TECHNICAL FIELD

The present invention relates to a one-way clutch apparatus of drive input-switching type for use in torque transmission, backstop and the like in a vehicle or industrial machinery.

BACKGROUND ART

A clutch mechanism of drive input-switching type in which rotations input from drive-side members in two drive systems are selectively output as a rotation of an output member in one driven system has been disclosed so far (see Patent Literature, Japanese Patent Application Laid-Open Publication No. 2012-67862 for example).

In the clutch mechanism of drive input-switching type described in the Patent Literature Japanese Patent Application Laid-Open Publication No. 2012-67862, two one-way clutches are axially juxtaposed and arranged coaxially, respective inner rings of the two one-way clutches are integrated to forma common inner ring, and respective outer rings of the two one-way clutches are driven by drive-side members different from each other.

CITATION LIST

Patent Literature: Japanese Patent Application Laid-Open Publication No. 2012-67862

SUMMARY OF INVENTION

Technical Problem

Demands for reduction in size of a clutch device, in particular, for shortening an axial dimension of the clutch device have grown in recent years. However, in a one-way clutch apparatus of drive input-switching type in which rotations input from drive-side members in two drive systems are selectively output as a rotation of an output member in one driven system, if two one-way clutches are axially juxtaposed and arranged in a limited axial space, a size of a torque transmitting member such as a roller in each of the one-way clutches, namely, an axial dimension of the torque transmitting member becomes small. Consequently, there is a problem of getting into difficulties in securing torque capacity necessary for each one-way clutch.

The present invention has been made in view of such circumstances, and is contemplated for providing a one-way clutch apparatus of drive input-switching type in which rotations input from drive-side members in two drive systems are selectively output as a rotation of an output member in one driven system, and torque capacity can be sufficiently secured without increasing an axial dimension of the clutch apparatus.

Solution to Problem

In order to solve the above-described problems, according to the present invention, there is provided a one-way clutch apparatus of drive input switching type, comprising:

a small diameter first input member, a large diameter and annular second input member, and an annular output member, all being arranged on a same axis to be rotatable relatively to each other;

the first input member and the output member being radially opposed to each other with a space therebetween;

the second input member and the output member being radially opposed to each other with a space therebetween;

a plurality of first torque transmitting members interposed between the first input member and the output member at circumferential predetermined intervals, and provided for transmitting first torque between the first input member and the output member;

a plurality of second torque transmitting members interposed between the second input member and the output member at circumferential predetermined intervals, and provided for transmitting second torque between the second input member and the output member; and a holder for holding the second torque transmitting members; and a rotation input into the first input member and a rotation input into the second input member being selectively transmitted to the output member, wherein the output member is arranged on a radially outer side of the first input member, and the second input member is arranged on a radially outer side of the output member;

the first torque transmitting member is a sprag; and the second torque transmitting member is a roller.

Moreover, according to a preferred aspect of the present invention, in the one-way clutch apparatus of drive input switching type, a first elastic member for energizing the plurality of sprags in a direction of interlocking with the first input member and the output member is disposed between the first input member and the output member.

Moreover, according to a preferred aspect of the present invention, in the one-way clutch apparatus of drive input switching type, an outer peripheral surface of the output member is formed on an outer peripheral surface with cam portions with which the plurality of rollers are respectively interlocked, and a plurality of second elastic members for energizing the respective plurality of rollers in a direction of interlocking with the corresponding cam portion are disposed.

Moreover, according to a preferred aspect of the present invention, in the one-way clutch apparatus of drive input switching type, a rotation having a larger speed of rotation between a rotation input into the first input member and a rotation input into the second input member is transmitted to the output member.

Moreover, according to a preferred aspect of the present invention, in the one-way clutch apparatus of drive input switching type, the holder has an annular portion covering an axial one side end portion of the one-way clutch.

The present invention can provide the one-way clutch apparatus of drive input-switching type in which rotations input from drive-side members in two drive systems are selectively output as a rotation of an output member in one drive system, and torque capacity can be secured without increasing an axial dimension of the one-way clutch apparatus.

DESCRIPTION OF EMBODIMENT

Hereinafter, an embodiment of a one-way clutch apparatus of drive input-switching type according to the present invention will be described with reference to drawings.

Figure 1:
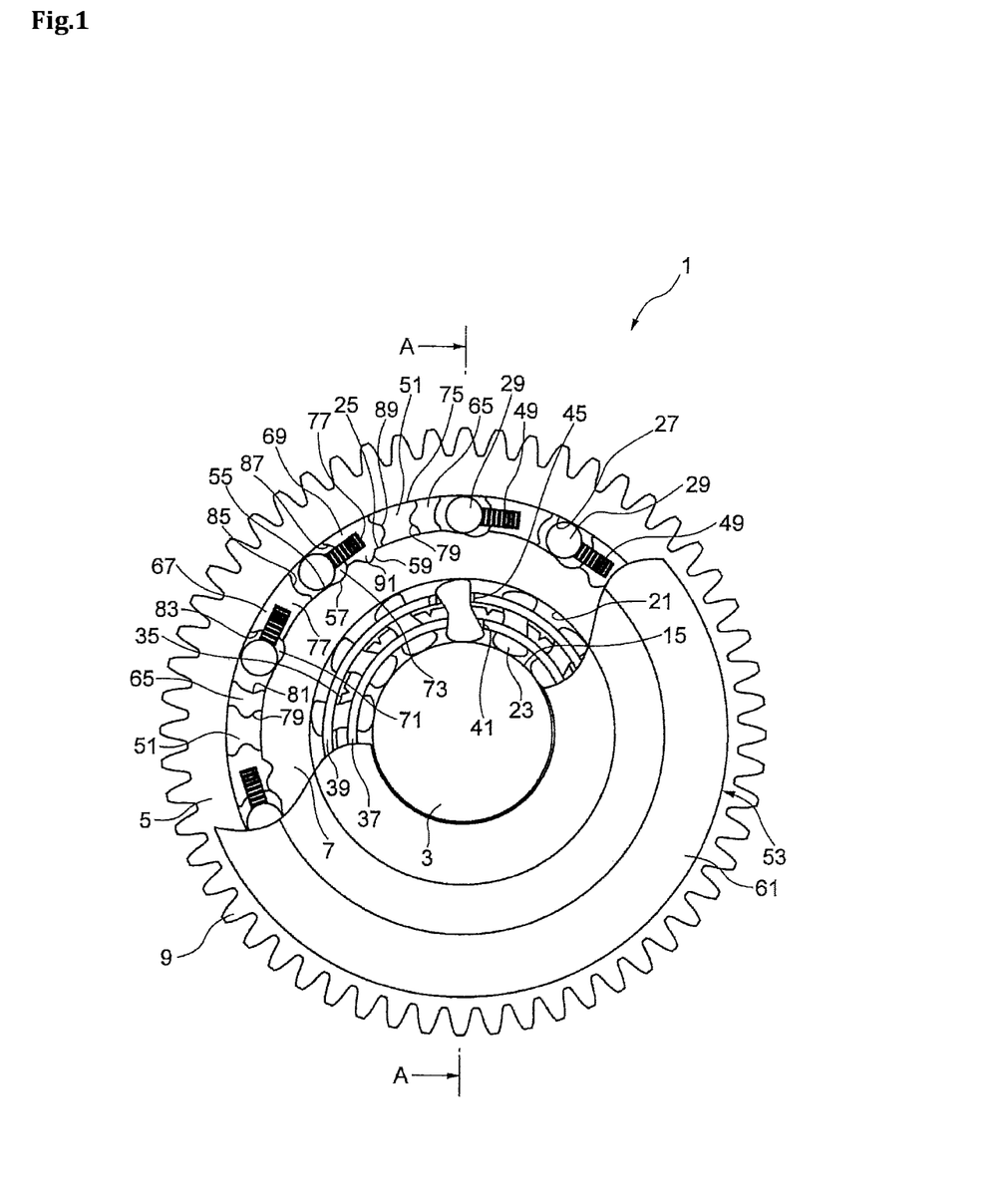
FIG. 1 is an axial first side front view showing a one-way clutch apparatus of drive input-switching type according to an embodiment of the present application, and showing a partially cut-away view.

FIG. 1 is an axial first side front view showing a one-way clutch apparatus of drive input-switching type according to an embodiment of the present application, and showing a partially cut-away view.

Figure 2:
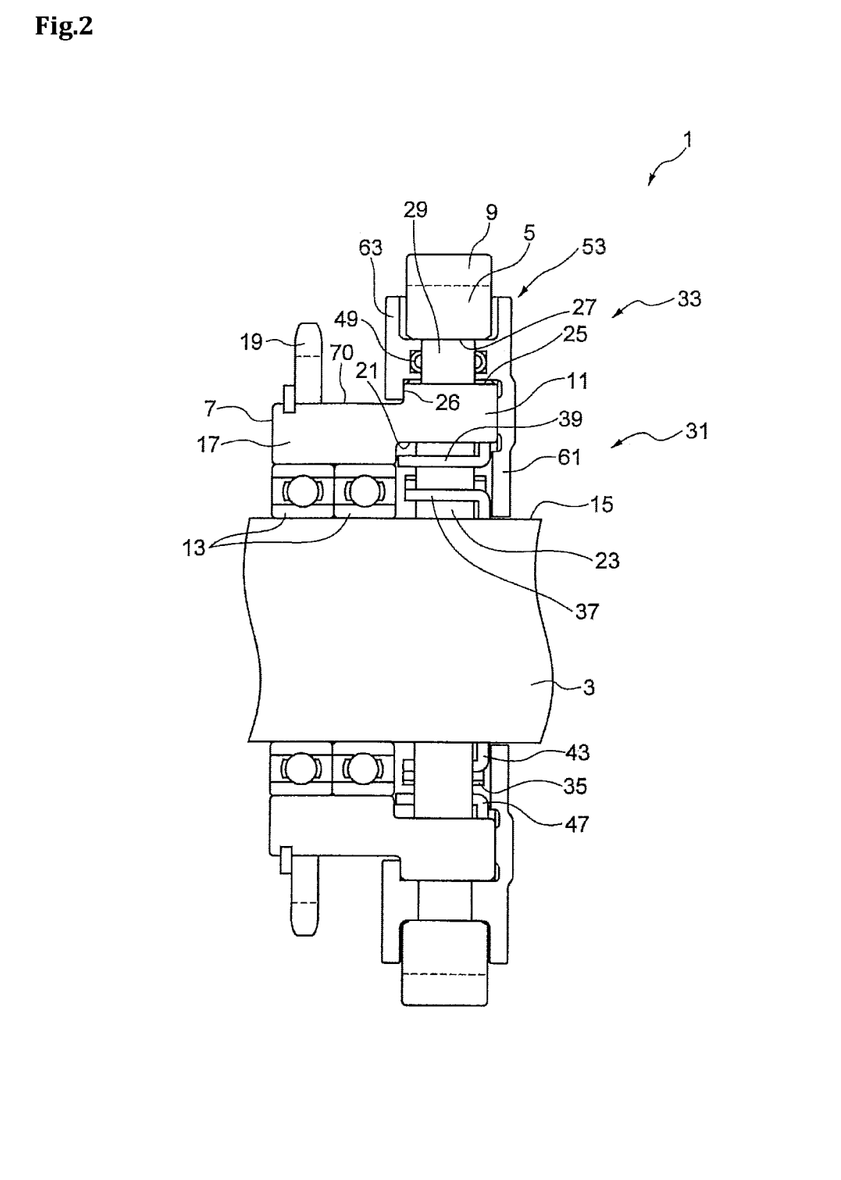
FIG. 2 shows a cross-sectional view taken along arrow A-A in FIG. 1.

FIG. 2 shows a cross-sectional view taken along arrow A-A in FIG. 1.

When a term: an axial direction, a radial or diameter direction or a circumferential direction is used herein, the term means the axial direction, the radial or diameter direction or the circumferential direction of the one-way clutch apparatus of drive input-switching type. More specifically, the term means the axial direction, the radial or diameter direction or the circumferential direction of a rotating axis of an inner ring or an outer ring of the one-way clutch apparatus of drive input-switching type. In FIG. 1, a front side of a paper surface is an axial first side, and a back side of the paper surface is an axial second side. In FIG. 2, a right-hand side of the paper surface is the axial first side, and a left-hand side of the paper surface is the axial second side. Moreover, with regard to the circumferential direction, a leftward rotation direction or counterclockwise direction toward the paper surface in FIG. 1 is taken as a circumferential first side, and a rightward rotation direction or clockwise direction toward the paper surface is taken as a circumferential second side.

As shown in FIG. 1 and FIG. 2, the one-way clutch apparatus 1 of drive input-switching type according to the present embodiment includes an axially extending small diameter shaft 3; a large diameter and annular outer ring 5 arranged in a radial direction outside of the shaft 3 on the same axis as the shaft 3; and a cylindrical intermediate ring 7 arranged in the radial direction outside of the shaft 3 and inside of the outer ring 5 on the same axis as the shaft 3 and the outer ring 5. The shaft 3 and the intermediate ring 7 are arranged to be rotatable relatively to each other. The intermediate ring 7 and the outer ring 5 are arranged to be rotatable relatively to each other.

The shaft 3 is connected to a drive-side member of a first rotary drive force generator (not shown) that is a first drive source. The shaft 3 is a cylindrical rotating member. In addition, the shaft 3 may be a solid rotating shaft. A gear 9 is formed on an outer periphery side of the outer ring 5, and the gear 9 is interlocked with a drive-side member of a second rotary drive force generator (not shown) that is a second drive source.

The intermediate ring 7 has a larger axial dimension than the outer ring 5 has. The intermediate ring 7 has: an annular torque transmitting portion 11 that is an axial first side part radially opposed to the outer ring 5 to transmit torque between the transmitting portion 11 and the outer ring 5 or between the transmitting portion 11 and the shaft 3 through torque transmitting members to be described later; and a cylindrical fitting portion 17 extending from the torque transmitting portion 11 to the axial second side, and fitted on an outer peripheral surface 15 of the shaft 3 through a pair of rolling bearings 13 juxtaposed on an inner peripheral surface of the cylindrical fitting portion 17. The torque transmitting portion 11 and the cylindrical fitting portion 17 are integrally formed. A gear 19 is fitted and fixed on the outer peripheral surface of the fitting portion 17 of the intermediate ring 7, in the vicinity of an axial second side end portion thereof. The gear 19 is connected to a driven-side device (not shown).

In a circumferential space between an inner peripheral surface 21 of the torque transmitting portion 11 of the intermediate ring 7 and a part of the outer peripheral surface 15 of the shaft 3 radially opposed to the inner peripheral surface 21, a plurality of first torque transmitting members, namely, a plurality of sprags 23, for transmitting the torque between the torque transmitting portion 11 of the intermediate ring 7 and the shaft 3 are interposed.

An outer peripheral surface 25 of the torque transmitting portion 11 of the intermediate ring 7 has a larger outer diameter dimension than an outer peripheral surface 70 of the fitting portion 17 of the intermediate ring 7 has. Accordingly, the outer peripheral surface 25 of the torque transmitting portion 11 and the outer peripheral surface 70 of the fitting portion 17 are continuous through a step portion 26. In a circumferential space between the outer peripheral surface 25 of the torque transmitting portion 11 of the intermediate ring 7 and an inner peripheral surface 27 of the outer ring 5 radially opposed to the outer peripheral surface 25, a plurality of second torque transmitting members, namely, a plurality of rollers 29, for transmitting the torque between the torque transmitting portion 11 of the intermediate ring 7 and the outer ring 5 are interposed.

In the one-way clutch apparatus 1 according to the present embodiment, the shaft 3 is a first input side member connected to the drive-side member of the first rotary drive force generator (not shown) that is the first drive source, the outer ring 5 is a second input side member connected to the drive-side member of the second rotary drive force generator (not shown) that is the second drive source, and the intermediate ring 7 is an output side member connected to the driven-side member (not shown) through the gear 19. More specifically, the one-way clutch apparatus 1 transmits selectively a one-way rotation input from the shaft 3 as the one-way rotation of the intermediate ring 7, and a one-way rotation input from the outer ring 5 as the one-way rotation of the intermediate ring 7.

Thus, the one-way clutch apparatus 1 according to the present embodiment includes an inner diameter side one-way clutch unit 31 for transmitting the one-way rotation input from the shaft 3 as the one-way rotation of the intermediate ring 7 through the plurality of sprags 23, and an outer diameter side one-way clutch unit 33 for transmitting the one-way rotation input from the outer ring 5 as the one-way rotation of the intermediate ring 7 through the plurality of rollers 29. The inner diameter side one-way clutch unit 31 and the outer diameter side one-way clutch unit 33, both being coaxial, are radially stacked. In other words, the outer diameter side one-way clutch unit 33 is arranged on a radially outer side of the inner diameter side one-way clutch unit 31 over the whole circumference. The inner diameter side one-way clutch unit 31 and the outer diameter side one-way clutch unit 33 apply the intermediate ring 7 as a common output side member.

Next, a configuration of the inner diameter side one-way clutch unit 31 and the outer diameter side one-way clutch unit 33 each will be described in detail. In addition, in the following explanation, "the inner peripheral surface 21 of the torque transmitting portion 11 of the intermediate ring 7" is referred to as "the inner peripheral surface 21 of the intermediate ring 7" and "the outer peripheral surface 25 of the torque transmitting portion 11 of the intermediate ring 7" is referred to as "the outer peripheral surface 25 of the intermediate ring 7", for convenience.

The inner diameter side one-way clutch unit 31 includes: the shaft 3 that is an inner ring member of the inner diameter side one-way clutch unit 31; the intermediate ring 7 that is an outer ring member of the inner diameter side one-way clutch unit 31; the plurality of sprags 23 interposed between the shaft 3 and the torque transmitting portion 11 of the intermediate ring 7; a ribbon spring 35 for providing the respective sprags 23 with rising moment between the shaft 3 and the intermediate ring 7; and a pair of an iron or metal inner diameter side holder 37 and an iron or metal outer diameter side holder 39 for holding the sprags 23 between the shaft 3 and the intermediate ring 7.

The shaft 3 is connected to the first rotary drive force generator (not shown), as described above. The outer peripheral surface 15 of the shaft 3 has a smooth cylindrical surface having a substantially perfect circle in a cross section. The inner peripheral surface 21 of the intermediate ring 7 has a cylindrical surface having a substantially perfect circle in the cross section.

As shown in FIG. 1, the sprags 23 each have a gourd shape in which a central portion is narrowed and a substantially radial direction is applied as a longitudinal direction. The plurality of sprags 23 are circumferentially arranged at equally spaced intervals. The sprags 23 each are radially inclined at a predetermined angle relative to the shaft 3 and the intermediate ring 7 so that the shaft 3 and the intermediate ring 7 are not interlocked with each other in non-torque transmitting state. When the sprags 23 each are interlocked with the outer peripheral surface 15 of the shaft 3 and the inner peripheral surface 21 of the intermediate ring 7, the torque is transmitted between the shaft 3 and the intermediate ring 7.

The ribbon spring 35 is arranged between the inner diameter side holder 37 and the outer diameter side holder 39. The ribbon spring 35 provides the respective sprags 23 with the rising moment. Specifically, the ribbon spring 35 rotates the respective sprags 23 such that the longitudinal direction of each sprag 23 comes close to a radial direction of the shaft 3 and the intermediate ring 7 to energize the sprag 23 in such a manner that the sprag 23 is brought into contact with the outer peripheral surface 15 of the shaft 3 and the inner peripheral surface 21 of the intermediate ring 7. More specifically, the ribbon spring 35 energizes each sprag 23 in a direction of interlocking with the shaft 3 and the intermediate ring 7.

The inner diameter side holder 37 is formed in a cylindrical shape and circumferentially has a plurality of radially penetrated openings 41. The inner diameter side holder 37 is arranged between the outer peripheral surface 15 of the shaft 3 and the ribbon spring 35. The sprag 23 is arranged by radially penetrating the opening 41 of the inner diameter side holder 37. In an axial first side end portion of the inner diameter side holder 37, a radially inwardly extending annular inward flange 43 is formed. An inner diameter side end portion of the inward flange 43 engages with the outer peripheral surface 15 of the shaft 3. Thus, the inner diameter side holder 37 is positioned, and centered. The inner diameter side holder 37 restricts circumferential movement of a radially inner side part of the sprag 23, thereby suppressing an excessive inclination of the sprag 23.

The outer diameter side holder 39 is formed in a cylindrical shape having a larger diameter than the inner diameter side holder 37, and circumferentially has a plurality of radially penetrated openings 45. The outer diameter side holder 39 is arranged between the inner peripheral surface 21 of the intermediate ring 7 and the ribbon spring 35. The sprag 23 is arranged by radially penetrating the opening 45 of the outer diameter side holder 39. In an axial first side end portion of the outer diameter side holder 39, a radially outwardly extending annular outward flange 47 is formed. An outer diameter side end portion of the outward flange 47 engages with the inner peripheral surface 21 of the intermediate ring 7. Thus, the outer diameter side holder 39 is positioned, and centered. The outer diameter side holder 39 restricts circumferential movement of a radially outer side part of the sprag 23, thereby suppressing the excessive inclination of the sprag 23.

In the inner diameter side one-way clutch unit 31 having such a configuration, if the shaft 3 rotates in a first direction, the sprags 23 each rotate in a direction in which the longitudinal direction of the sprag 23 comes close to the radial direction of the shaft 3 and the intermediate ring 7 in association with the rotation of the shaft 3. More specifically, the sprags 23 each rise and are interlocked with the outer peripheral surface 15 of the shaft 3 and the inner peripheral surface 21 of the intermediate ring 7. Accordingly, the shaft 3 and the intermediate ring 7 rotate integrally. Thus, the torque input from the shaft 3 is transmitted to the intermediate ring 7 through the sprags 23, and is output from the intermediate ring 7.

The outer diameter side one-way clutch unit 33 includes: the intermediate ring 7 that is an inner ring member of the outer diameter side one-way clutch unit 33; the outer ring 5 that is an outer ring member of the outer diameter side one-way clutch unit 33; the plurality of rollers 29 interposed between the outer peripheral surface 25 of the intermediate ring 7 and the inner peripheral surface 27 of the outer ring 5; coil-shaped or accordion-shaped springs 49 each for energizing the roller 29 in a direction of interlocking with the intermediate ring 7 and the outer ring 5; block bearings 51 each having a bearing function for supporting a radial load; and a resin-made holder 53 for holding the rollers 29 and the block bearings 51.

On the outer peripheral surface 25 of the intermediate ring 7, a plurality of cam portions 57 each including a cam surface 55 with which the roller 29 is interlocked are formed. The plurality of cam portions 57 are circumferentially formed at predetermined intervals. The cam portion 57 is formed as a concave portion dented from the outer peripheral surface 25 of the intermediate ring 7 to the radially inward direction. The cam surface 55 of the cam portion 57 is an inclined surface inclined in a direction in which a radial interval between the cam portion 57 and the inner peripheral surface 27 of the outer ring 5 increases accordingly as the cam surface 55 is directed from a circumferential first end to a circumferential second end. Accordingly, as shown in FIG. 1, the cam surface 55 and a part of the inner peripheral surface 27 of the outer ring 5 opposed to the cam surface 55 form a wedge-shaped space in which the radial interval increases accordingly as the cam surface 55 is directed from the circumferential first side to the circumferential second side. Circumferential both ends of the cam surface 55 are smoothly continuous with the outer peripheral surface 25 of the intermediate ring 7. In addition, on the outer peripheral surface 25 of the intermediate ring 7, a plurality of axial grooves 59 are formed at circumferential predetermined intervals.

The rollers 29 each are a column-shaped member. The roller 29 is arranged in such a manner that an axial direction of the roller 29 per se is directed to be in parallel to an axial direction of the intermediate ring 7 and the outer ring 5 each. The roller 29 slides as well as rolls on the cam surface 55 of the cam portion 57.

As shown in FIG. 1, the block bearings 51 each have a gourd shape in which a central portion of circumferential both side surfaces is narrowed. A plurality of block bearings 51 are circumferentially arranged at substantially equally spaced intervals to keep a radial interval between the intermediate ring 7 and the outer ring 5, thereby coaxially holding the intermediate ring 7 and the outer ring 5.

The holder 53 is formed of a radially extending large diameter first annular plate portion 61 arranged in an axial first side of the outer ring 5; a radially extending second annular plate portion 63 arranged axially opposed to a radially outward side part of the first annular plate portion 61 on the axial second side of the outer ring 5; and first column portions 65, second column portions 67 and third column portions 69, each radially linking the first annular portion 61 and the second annular portion 63. The first column portion 65, the second column portion 67 and the third column portion 69 form one set in this order from the circumferential first side toward the circumferential second side, and a plurality of sets are provided over the whole circumference of the holder 53.

The first annular plate portion 61 of the holder 53 radially extends from a neighborhood portion of the outer peripheral side end portion of the outer ring 5 to a neighborhood portion of the outer peripheral surface 15 of the shaft 3. The radial outer side part of an axial second side surface of the first annular plate portion 61 is opposed to the radial first side end surface of the outer ring 5, and a radial intermediate part of the first annular plate portion 61 is brought into contact with the axial first side end surface of the intermediate ring 7. An inner diameter side end of the first annular plate portion 61 is radially opposed to the outer peripheral surface 15 of the shaft 3 through a slight clearance.

The second annular plate portion 63 of the holder 53 radially extends from the neighborhood portion of the outer peripheral side end portion of the outer ring 5 to a neighborhood portion of the outer peripheral surface 70 of the fitting portion 17 of the intermediate ring 7. A radially outer side part of an axial first side surface of the second annular plate portion 63, is opposed to an axial second side end surface of the outer ring 5, and a radially inner side part in the axial first side surface of the second annular plate portion 63 is brought into contact with a surface of the step portion 26 of the intermediate ring 7. An inner diameter side end of the second annular plate portion 63 is radially opposed to the outer peripheral surface 70 of the fitting portion 17 of the intermediate ring 7 through the slight clearance. Thus, in the holder 53, the axial second side surface of the first annular plate portion 61 is brought into contact with the axial first side end surface of the intermediate ring 7, and the axial first side surface of the second annular plate portion 63 is brought into contact with the surface of the step portion 26 of the intermediate ring 7. Thus, radial movement of the holder 53 is regulated.

As shown in FIG. 1 and FIG. 2, the first annular plate portion 61 of the holder 53 covers the axial first side end portion of the one-way clutch 1 substantially over the whole surface area. Specifically, the first annular plate portion 61 covers the axial first side end surface of the outer ring 5 and the axial first side end surface of the intermediate ring 7, and simultaneously blocks an axial first side opening of each of the circumferential spaces between the outer ring 5 and the intermediate ring 7 and between the intermediate ring 7 and the shaft 3. Further, the second annular plate portion 63 of the holder 53 covers the axial second side end surface of the outer ring 5, and simultaneously blocks an axial second side opening of the circumferential space between the outer ring 5 and the intermediate ring 7.

A first pocket portion 71 is formed between the first column portion 65 and the second column portion 67 circumferentially adjacent to each other. A second pocket portion 73 is formed between the second column portion 67 and the third column portion 69 circumferentially adjacent to each other. A third pocket portion 75 is formed between the third column portion 69 and the first column portion 65 circumferentially adjacent to each other. The rollers 29 each are arranged in the first pocket portion 71 and the second pocket portion 73. The block bearings 51 each are arranged in the respective third pocket portions 75.

A circumferential second side surface 81 of the first column portion 65 is opposed to the roller 29 arranged in the first pocket portion 71 and is formed in a curved surface having the substantially same curvature as the outer peripheral surface of the roller 29. A concave portion 77 is formed on a circumferential first side surface 83 of the second column portion 67, and in the concave portion 77, the spring 49 is disposed for energizing the roller 29 arranged in the first pocket portion 71 in an interlocking direction, namely, on the circumferential first side. A circumferential second side surface 85 of the second column portion 67 is opposed to the roller 29 arranged in the second pocket portion 73, and is formed in a curved surface having the substantially same curvature as the outer peripheral surface of the roller 29. The concave portion 77 is formed on a circumferential first side surface 87 of the third column portion 69, and in the concave portion 77, a spring 49 is disposed for energizing the roller 29 arranged in the second pocket portion 73 in the interlocking direction.

A circumferential second side surface 89 of the third column portion 69 is formed in a curved surface corresponding to a dent shape of a circumferential first side surface of the block bearing 51 arranged in the third pocket portion 75, and is brought into contact with the circumferential first side surface of the block bearing 51 on the whole surface. A circumferential first side surface 79 of the first column portion 65 is formed in a curved surface corresponding to a dent shape of a circumferential second side surface of the block bearing 51 arranged in the third pocket portion 75, and is brought into contact with the circumferential second side surface of the block bearing 51 on the whole surface. According to the configuration, the block bearing 51 is regulated in circumferential movement by the third column portion 69 and the first column portion 65, and simultaneously suppressed also in backlash to the radially outward direction.

On an inner peripheral surface of the third column portion 69, an axially extending protruding portion 91 protruding in the radially inward direction is formed. The protruding portion 91 engages with the axial groove 59 formed on the outer peripheral surface 25 of the intermediate ring 7. Thus, the holder 53 is regulated in a rotation relative to the intermediate ring 7 and rotates integrally with the intermediate ring 7.

In the outer diameter side one-way clutch unit 33 having such a configuration, if the outer ring 5 rotates in the first or counterclockwise direction, the roller 29 rolls as well as slides on the inner peripheral surface 27 of the outer ring 5 and the cam surface 55 of the intermediate ring 7 in association with the rotation of the outer ring 5, and moves to the circumferential first side of the cam surface 55. If the roller 29 moves to the circumferential first side of the cam surface 55, the roller 29 is interlocked with the cam surface 55 and the inner peripheral surface 27 of the outer ring 5. More specifically, the roller 29 is interlocked with the intermediate ring 7 and the outer ring 5, and the intermediate ring 7 and the outer ring 5 integrally rotate by the interlocking. Thus, the torque input from the outer ring 5 is transmitted to the intermediate ring 7 through the rollers 29, and is output from the intermediate ring 7.

As described above, the one-way clutch apparatus 1 according to the present embodiment includes the inner diameter side one-way clutch unit 31 using the sprags 23 as the torque transmitting members, and the outer diameter side one-way clutch unit 33 using the rollers 29 as the torque transmitting members, and has the configuration in which the inner diameter side one-way clutch unit 31 and the outer diameter side one-way clutch unit 33 are radially stacked. More specifically, the outer diameter side one-way clutch unit 33 is arranged on the radially outer side of the inner diameter side one-way clutch unit 31 over the whole circumference area. Then, the outer ring member of the inner diameter side one-way clutch unit 31 and the inner ring member of the outer diameter side one-way clutch unit 33 are formed in the common intermediate ring 7, and the intermediate ring 7 is formed as the common output side member between the inner diameter side one-way clutch unit 31 and the outer diameter side one-way clutch unit 33.

In the one-way clutch apparatus 1 according to the present embodiment, if the rotary drive force generated in the first rotary drive force generator (not shown) is input into the shaft 3 that is the first input side member, the rotary drive force is transmitted to the intermediate ring 7, and is output as the rotation of the intermediate ring 7. On the other hand, if the rotary drive force generated in the second rotary drive force generator (not shown) is input into the outer ring 5 that is the second input side member, the rotary drive force is transmitted to the intermediate ring 7, and is output as the rotation of the intermediate ring 7.

In the one-way clutch apparatus 1 according to the present embodiment, the drive input side members can be switched and controlled in such a manner that the rotation input into either the shaft 3 or the outer ring 5 is transmitted to the intermediate ring 7. In the present embodiment, control is made so as to select the input from the input side member having a larger speed of rotation. More specifically, the control is made in such a manner that, in the two one way clutch units one having the shaft 3 and the other having the outer ring 5, the one-way clutch unit on a side corresponding to the larger speed of rotation is brought into engagement with the intermediate ring 7, and the rotation is transmitted to the intermediate ring 7.

Next, an advantageous effect of the one-way clutch apparatus 1 according to the present embodiment will be described.

In the one-way clutch apparatus 1 according to the present embodiment, an increase of the axial dimension can be suppressed by applying the configuration as described above. More specifically, two one-way clutch units 31 and 33 can be arranged in a limited axial space without reducing the axial dimension of the sprags 23 and the rollers 29 that are the torque transmitting members of the inner diameter side one-way clutch unit 31 and the outer diameter side one-way clutch unit 33, respectively. Further, it is unnecessary to reduce the axial dimensions of the sprags 23 and the rollers 29 that are the torque transmitting members of the two one-way clutch units 31 and 33, respectively, and therefore a sufficient axial dimension can be secured for the sprags 23 and the rollers 29. As a result, sufficient torque capacity can be secured for the inner diameter side one-way clutch unit 31 and the outer diameter side one-way clutch unit 33, respectively.

The one-way clutch apparatus 1 according to the present embodiment employs the sprags 23 as the torque transmitting members of the inner diameter side one-way clutch unit 31. The torque capacity of the inner diameter side one-way clutch unit 31 can be further efficiently increased by applying the configuration. The rollers 29 can also be employed as the torque transmitting members of the inner diameter side one-way clutch unit 31. However, since a diameter dimension is small in the circumferential space between the shaft 3 and the intermediate ring 7, when the rollers 29 are employed, the number of rollers 29 that can be arranged in the space decreases. If the number of rollers 29 decreases, the torque capacity of the inner diameter side one-way clutch unit 31 is apt to become insufficient.

In contrast, if the sprags 23 are used as in the present embodiment, as shown in FIG. 1, a large number of sprags 23 can be arranged. Accordingly, the sufficient torque capacity can be efficiently secured even in the inner diameter side one-way clutch unit 31 having a small diameter dimension.

Further, when the rollers 29 are employed as the torque transmitting members of the inner diameter side one-way clutch unit 31, it is necessary to provide the cam surfaces with which the rollers 29 are interlocked, on the outer peripheral surface 15 of the shaft 3 that is the inner ring member of the inner diameter side one-way clutch unit 31. When the cam surfaces are provided on the outer peripheral surface 15 of the shaft 3, the shaft 3 per se is machine-processed, and therefore the number of machinings are apt to increase, and simultaneously manufacturing cost also is apt to increase.

Alternatively, the cam surfaces are provided on the outer peripheral surface of any separate annular member (not shown) in stead of directly providing the cam surfaces on the outer peripheral surface 15 of the shaft 3, and the separate annular member thus formed with the cam surfaces is fixed on the outer peripheral surface of a shaft (not shown) having a smaller diameter than the shaft 3 through fitting by serration, thereby forming the inner ring member of the inner diameter side one-way clutch unit 31. However, even in this latter case, the number of parts increases and the machining or assembling of the annular member and the shaft also increase.

In contrast, if the sprags 23 are employed as in the present embodiment, a simple cylindrical shaft 3 can be applied as the inner ring member, and therefore an increase in the number of parts, an increase in the machining or assembling steps, and an increase in manufacturing cost can be suppressed.

The one-way clutch apparatus 1 according to the present embodiment employs the rollers 29 as the torque transmitting members of the outer diameter side one-way clutch unit 33. Operation of the outer diameter side one-way clutch unit 33 can be stabilized by applying the configuration. In general, in a one-way clutch rotating at a high speed, operation of engagement and disengagement between the outer ring side member and the inner ring side member is required to be stabilized. Further, when the outer ring side member and the inner ring side member are required to simultaneously rotate and torque transmission therebetween is also required, a roller type one-way clutch of inner cam type in which the inner ring side member is formed with cam surfaces, is further suitable. Therefore, according to the present embodiment, the operation of engagement and disengagement of the outer diameter side one-way clutch unit 33 can be stabilized.

In the one-way clutch apparatus 1 according to the present embodiment, the holder 53 covers the axial first side end portion of the one-way clutch apparatus 1 substantially over the whole surface area. According to the configuration, the outer ring 5, the rollers 29, the springs 49, and the block bearings 51 of the outer diameter side one-way clutch unit 33, and the sprag 23, the ribbon spring 35, the inner diameter side holder 37, and the outer diameter side holder 39 of the inner diameter side one-way clutch unit 31, are prevented from falling-off to the axial direction. More specifically, the holder 53 also serves as a retaining member for preventing the outer ring 5 and the torque transmitting members of the one-way clutch 1 from falling off to the axial direction.

Figure 3:
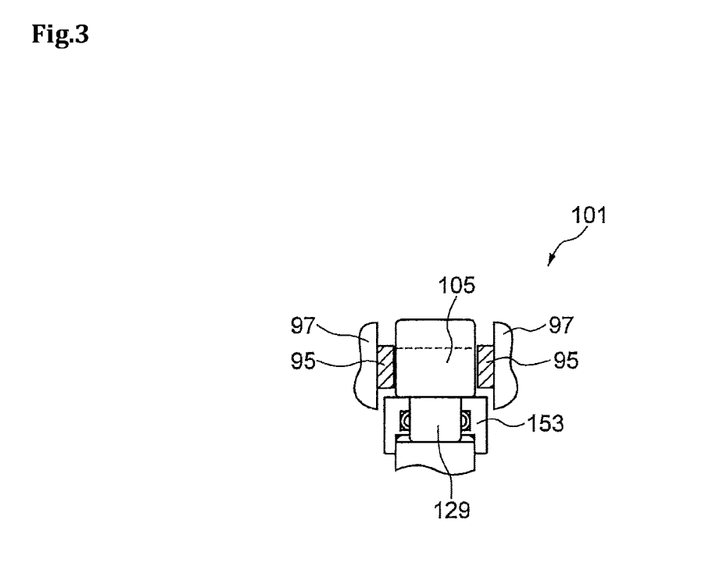
FIG. 3 is a cross-sectional view showing a part of a conventional one-way clutch.

Here, FIG. 3 is a cross-sectional view of a part of a conventional roller type one-way clutch 101, which is shown for comparison. As shown in FIG. 3, in the conventional roller type one-way clutch 101, a retaining member 95 and a counterpart fixing member 97 for regulating an axial position of the retaining member 95 have been provided on axial both sides of an outer ring 105 apart from a holder 153, in order to prevent the outer ring 105 from falling off to the axial direction.

In contrast, the holder 53 in the one-way clutch apparatus 1 according to the present invention serves for retaining the outer ring 5 in addition to the rollers 29, springs 49 and block bearings 51, and therefore the number of parts and weight can be reduced.

Further, the holder 53 is formed of resin. According to the configuration, the holder 53 can be further easily machined or processed in comparison with a case where the holder 53 is formed of metal, and an increase in manufacturing cost can be suppressed. When the holder 53 is formed of metal, it is necessary to provide a retaining member (not shown) for blocking the opening of the circumferential space between the outer ring 5 and the intermediate ring 7 in order to prevent direct contact between an end surface of the roller 29 and the metal holder 53. Similarly, when the holder 53 is formed of metal, a retaining member (not shown) for blocking the opening of the circumferential space between the intermediate ring 7 and the shaft 3 and a retaining member (not shown) interposed between an axial first side end portion of the intermediate ring 7 and the holder 53 are required. On the contrary, if the holder 53 is formed of resin as in the prevent embodiment, it is unnecessary to provide such a retaining member, and therefore an increase in the number of parts and an increase in manufacturing cost can be suppressed.

In addition, the one-way clutch apparatus of drive input-switching type according to the present embodiment is not limited to the above-described embodiment, and can be modified. For example, the number of sprags 23 or the number of rollers 29 can be appropriately adjusted according to necessary torque capacity.

REFERENCE SIGNS LIST 1 one-way clutch apparatus
3 shaft
5 outer ring
7 intermediate ring
9 gear
11 torque transmitting portion
13 rolling bearing
15 outer peripheral surface of shaft
19 gear
21 inner peripheral surface of torque transmitting portion
23 sprag
25 outer peripheral surface of torque transmitting portion
27 inner peripheral surface of outer ring
29 roller
31 inner diameter side one-way clutch unit
33 outer diameter side one-way clutch unit
35 ribbon spring
37 inner diameter side holder
39 outer diameter side holder
41 opening
43 inward flange
45 opening
47 outward flange
49 spring
51 block bearing
53 holder
55 cam surface
57 cam portion
59 axial groove
61 first annular plate portion
63 second annular plate portion
65 first column portion
67 second column portion
69 third column portion
71 first pocket portion
73 second pocket portion
75 third pocket portion
77 concave portion
91 protruding portion

What is claimed is:

1. A one-way clutch apparatus of drive input switching type, comprising:
a small diameter first input member, a large diameter and annular second input member, and an annular output member, all being arranged on a same axis to be rotatable relatively to each other;
the first input member and the output member being radially opposed to each other with a space therebetween;
the second input member and the output member being radially opposed to each other with a space therebetween;
a plurality of first torque transmitting members interposed between the first input member and the output member at circumferential predetermined intervals, and provided for transmitting first torque between the first input member and the output member;
a plurality of second torque transmitting members interposed between the second input member and the output member at circumferential predetermined intervals, and provided for transmitting second torque between the second input member and the output member; and
a holder for holding the second torque transmitting members; and
a rotation input into the first input member and a rotation input into the second input member being selectively transmitted to the output member,
wherein the output member is arranged on a radial outer side of the first input member, and the second input member is arranged on a radial outer side of the output member;
the first torque transmitting member is a sprag; and
the second torque transmitting member is a roller.

2. The one-way clutch apparatus according to claim 1, wherein a first elastic member for energizing the plurality of sprags in a direction of interlocking with the first input member and the output member, is disposed between the first input member and the output member.

3. The one-way clutch apparatus according to claim 1, wherein an outer peripheral surface of the output member is formed on an outer peripheral surface with cam portions with which the plurality of rollers are respectively interlocked, and a plurality of second elastic members for energizing the respective plurality of rollers in a direction of interlocking with the corresponding cam portion are disposed.

4. The one-way clutch apparatus according to claim 1, wherein a rotation having a larger speed of rotation between a rotation input into the first input member and a rotation input into the second input member is transmitted to the output member.

5. The one-way clutch apparatus according to claim 2, wherein a rotation having a larger speed of rotation between a rotation input into the first input member and a rotation input into the second input member is transmitted to the output member.

6. The one-way clutch apparatus according to claim 3, wherein a rotation having a larger speed of rotation between a rotation input into the first input member and a rotation input into the second input member is transmitted to the output member.

7. The one-way clutch apparatus according to claim 1, wherein the holder comprises an annular portion covering an axial one side end portion of the one-way clutch apparatus.

8. The one-way clutch apparatus according to claim 2, wherein the holder comprises an annular portion covering an axial one side end portion of the one-way clutch apparatus.

9. The one-way clutch apparatus according to claim 3, wherein the holder comprises an annular portion covering an axial one side end portion of the one-way clutch apparatus.

10. The one-way clutch apparatus according to claim 4, wherein the holder comprises an annular portion covering an axial one side end portion of the one-way clutch apparatus.

11. The one-way clutch apparatus according to claim 2, wherein an outer peripheral surface of the output member is formed on an outer peripheral surface with cam portions with which the plurality of rollers are respectively interlocked, and a plurality of second elastic members for energizing the respective plurality of rollers in a direction of interlocking with the corresponding cam portion are disposed.

12. The one-way clutch apparatus according to claim 11, wherein a rotation having a larger speed of rotation between a rotation input into the first input member and a rotation input into the second input member is transmitted to the output member.

13. The one-way clutch apparatus according to claim 11, wherein the holder comprises an annular portion covering an axial one side end portion of the one-way clutch apparatus.

* * * * *